United States Patent

Stuedemann et al.

Patent Number: 5,481,938
Date of Patent: Jan. 9, 1996

[54] POSITION CONTROL APPARATUS FOR STEERING COLUMN

[75] Inventors: Richard T. Stuedemann; Russell L. Herlache, both of Saginaw; Ray G. Armstrong, Bay City, all of Mich.

[73] Assignee: General Motors Corporation, Detroit, Mich.

[21] Appl. No.: 236,075

[22] Filed: May 2, 1994

[51] Int. Cl.[6] ................................................. B62D 1/18
[52] U.S. Cl. ........................... 74/493; 74/531; 280/775; 411/330; 411/961
[58] Field of Search .................. 74/493, 531; 280/775; 411/330, 332, 235, 240, 961, 971

[56] References Cited

U.S. PATENT DOCUMENTS

| | | | |
|---|---|---|---|
| 4,244,237 | 1/1981 | Sprunger | 74/493 |
| 4,363,499 | 12/1982 | Watanabe et al. | 280/775 |
| 4,472,982 | 9/1984 | Nishikawa | 74/493 |
| 4,541,298 | 9/1985 | Strutt | 74/493 |
| 4,732,050 | 3/1988 | Vollmer | 74/493 |
| 4,774,851 | 10/1988 | Iwanami et al. | 74/493 |
| 4,788,880 | 12/1988 | Kester | 74/493 |
| 5,117,707 | 6/1992 | Kinoshita et al. | 74/493 |
| 5,160,165 | 11/1992 | Hoblingre | 280/775 |
| 5,199,319 | 4/1993 | Fujiu | 74/493 X |

Primary Examiner—Rodney H. Bonck
Assistant Examiner—Troy Grabow
Attorney, Agent, or Firm—Saul Schwartz

[57] ABSTRACT

A position control apparatus for a raked steering column including a stationary bracket having a pair of vertical legs on opposite sides of the steering column, a spacer on the steering column between the legs of the stationary bracket, and a clamp on the steering column for squeezing the legs of the stationary bracket against the spacer. The clamp includes a long bolt spanning the legs of the stationary bracket, a nut on the bolt, a one-way clutch between a head of the bolt and the stationary bracket permitting rotation of the bolt in only a tension-increasing direction, and a snap-on operating lever rotatable as a unit with the nut. After assembly on a vehicle, the clamp afforded by the bolt can be adjusted without changing the terminal positions of the lever by rotating the head of the bolt in a tension increasing direction while the operating lever is maintained in a clamped terminal position corresponding to maximum bolt tension between the vertical legs of the stationary bracket.

7 Claims, 4 Drawing Sheets

5,481,938

POSITION CONTROL APPARATUS FOR STEERING COLUMN

FIELD OF THE INVENTION

This invention relates to position control apparatus for adjustable motor vehicle steering columns.

BACKGROUND OF THE INVENTION

Motor vehicle steering columns mounted on a vehicle body for up and down pivotal movement about a geometric center located near the innermost end of the steering column are sometimes referred to as "rake adjustable" or "raked" steering columns. Prior position control apparatus for raked steering columns typically includes a stationary bracket with vertical legs on opposite sides of the steering column and a lever actuated clamp on the steering column for squeezing the legs of the bracket against a spacer on the steering column. Usually, the clamp consists of a long bolt on the steering column spanning the legs of the stationary bracket and rotatable with the lever and a nut threaded onto the bolt but restrained against rotation relative to the stationary bracket. To permit initial adjustment of the bolt tension without changing the terminal positions of the angular stroke of the operating lever, it has heretofore been necessary to rotatably mount the operating lever on the bolt and then, after the bolt is adjusted relative to the nut, press a crank arm onto the bolt head and connect it to the operating lever with a cap screw or the like. While effective, the multiplicity of components contributes to cost and complexity. A raked steering column position control apparatus according to this invention is an improvement over prior control apparatus of the type described above.

SUMMARY OF THE INVENTION

This invention is a new and improved position control apparatus for a raked steering column on a motor vehicle generally including a stationary bracket on the vehicle body with a pair of vertical legs on opposite sides of the steering column, a spacer on the steering column between the legs of the stationary bracket, and a clamp on the steering column for squeezing the legs of the stationary bracket against the spacer. In the position control apparatus according to this invention, the clamp includes a long bolt spanning the legs of the stationary bracket, a one-way clutch between a head end of the bolt and the stationary bracket permitting rotation of the bolt from the head end in only a tension-increasing direction, a nut on the opposite end of the bolt, and a snap-on lever rotatable as a unit with the nut. In initially assembling the position control apparatus on the steering column, the lever is snapped onto the nut after the latter is tightened to a measured torque which defines a nominal clamp between the stationary bracket and the steering column. If, due to manufacturing tolerance, the nominal clamp requires adjustment, the bolt is rotated from the head end thereof relative to the nut in a tension increasing direction with the lever in a clamped terminal position to increase the friction clamp without changing the terminal positions of the lever.

DESCRIPTION OF A PREFERRED EMBODIMENT

Figure 1:
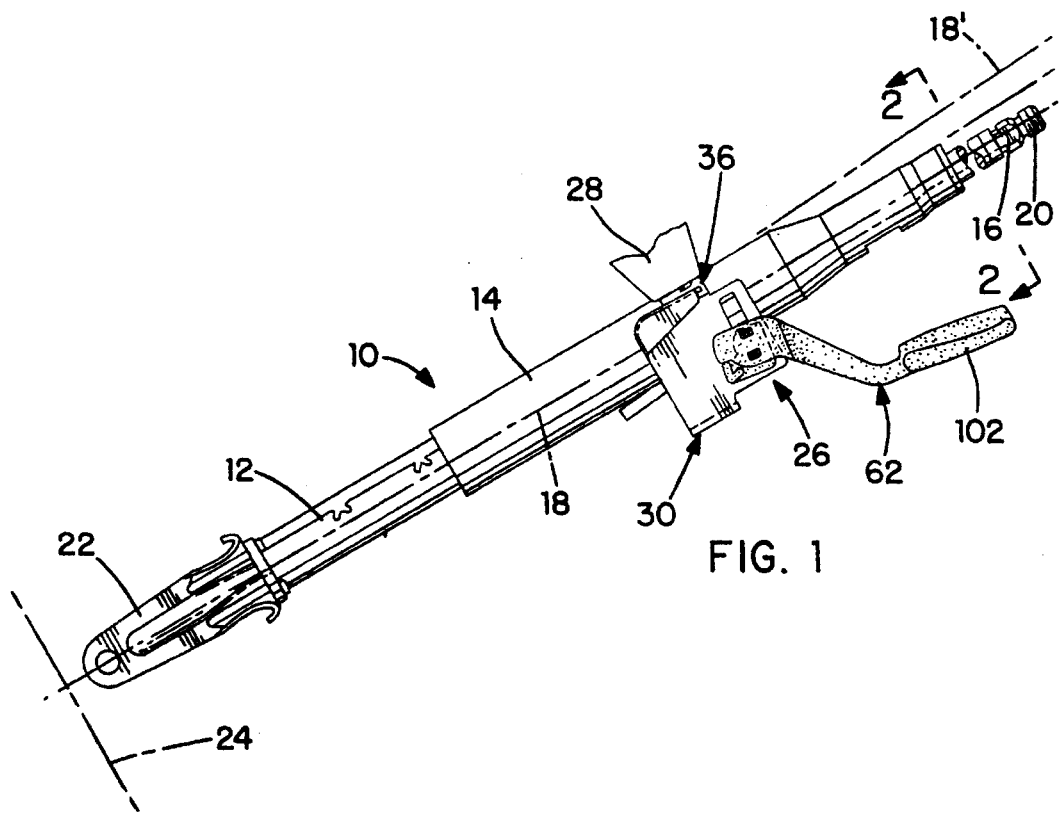
FIG. 1 is an elevational view of a raked steering column having a position control apparatus according to this invention.

Referring to FIG. 1, a motor vehicle raked steering column 10 includes a tubular lower mast jacket 12 and a tubular upper mast jacket 14 telescopically overlapping the lower mast jacket. An energy absorbing apparatus, not shown, is disposed between the mast jackets at the overlap and may have the construction described generally in U.S. Pat. No. 3,392,599, issued 16 Jul. 1968 and assigned to the assignee of this invention. A steering shaft 16 is supported on the mast jackets 12,14 for rotation about a longitudinal centerline 18 of the steering column. A steering wheel, not shown, is attached to a threaded end 20 of the steering shaft.

A fork-shaped clevis 22 is rigidly attached to the lower mast jacket 12 at the lower end thereof. The clevis is connected to a schematically represented front panel 24 of a vehicle body such that the steering column is pivotable up and down about an axis perpendicular to the centerline 18 between a down-limit position, FIG. 1, and an up-limit position represented by a broken-line position 18' of the centerline 18. A position control apparatus 26 according to this invention is disposed between the steering column 10 and a structurally rigid element 28, FIG. 1, of the vehicle body.

Figure 2:
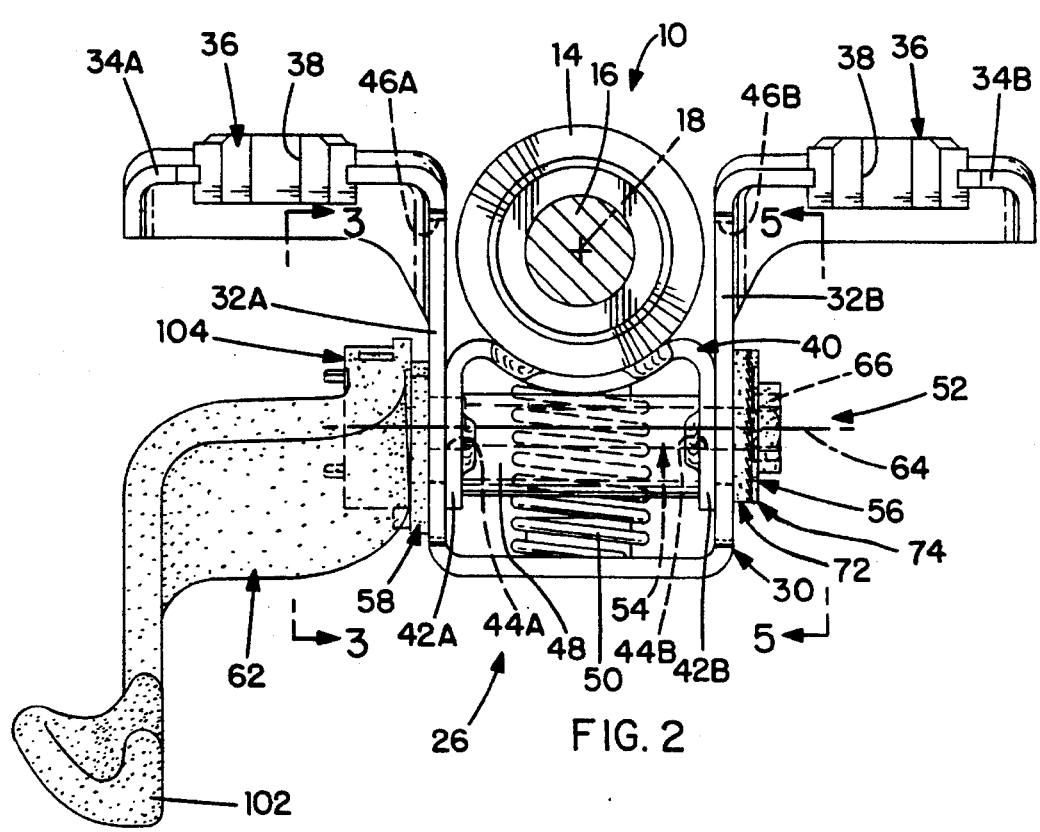
FIG. 2 is an enlarged sectional view taken generally along the plane indicated by lines 2—2 in FIG. 1.
Figure 7:
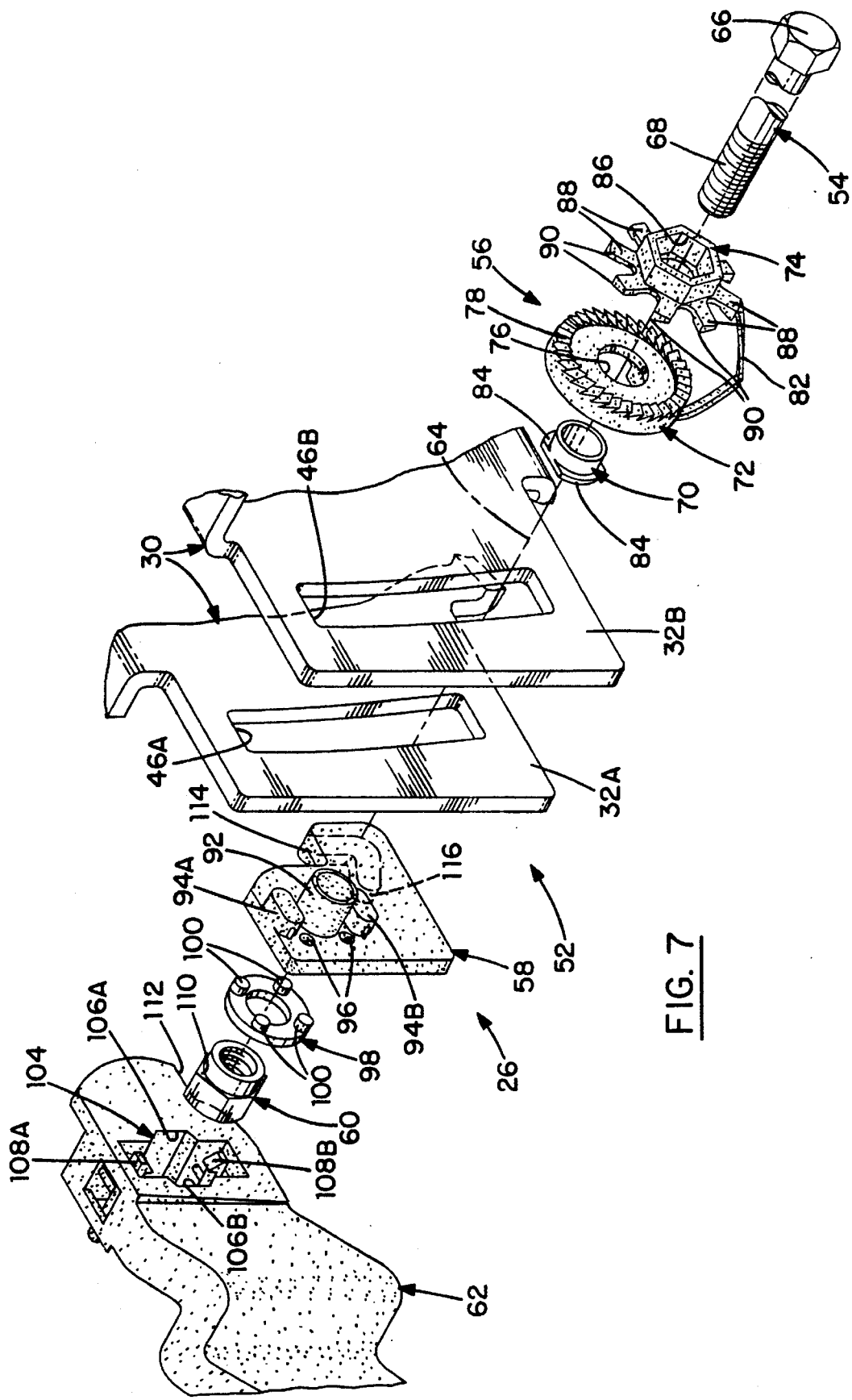
FIG. 7 is an exploded perspective view of a position control apparatus according to this invention.

As seen best in FIGS. 1, 2 and 7, the control apparatus includes a U-shaped steel bracket 30 having a pair of vertical legs 32A-B on opposite sides of the upper mast jacket and a pair of horizontal wings 34A-B. As described in the aforesaid U.S. Pat. No. 3,392,599, a capsule 36 is mounted in a slot in each wing 34A-B. Hanger bolts, not shown, attached to the rigid element 28 of the vehicle body project through a passage 38 in each capsule. Nuts, not shown, on the hanger bolts below the capsules rigidly affix the capsules to the structural element 28. In an energy absorbing collapse event of the steering column, the slots in the wings 34A-B permit release of the wings of the bracket 30 from the capsules 36.

A spacer 40, FIG. 2, is welded to the upper mast jacket between the legs 32A-B of the stationary bracket and includes a pair of vertical sides 42A-B juxtaposed the legs 32A-B of the bracket 30. A pair of apertures 44A-B in the sides 42A-B, respectively, of the spacer register with corresponding ones of a pair of substantially vertical slots 46A-B in the legs 32A-B, respectively, of the bracket 30. A channel-shaped reinforcement 48 is welded to the spacer 40 between the sides 42A-B thereof. A spring 50 seated on the stationary bracket 30 biases the steering column 10 toward the up-limit position 18'.

A clamp 52 of the position control apparatus 26 is mounted on the steering column 10 for squeezing the vertical legs 32A-B of the stationary bracket against the sides 42A-B of the spacer 40 and includes a long bolt 54, a one-way clutch 56, a lever stop 58, a hexagon nut 60, and a plastic operating lever 62. The bolt 54 is supported on opposite sides of the spacer 40 in the apertures 44A-B and spans the vertical legs 32A-B. The centerline of the bolt defines a lateral centerline 64 of the clamp, FIG. 7. A hexagon head 66 of the bolt 54 is disposed outboard of the vertical leg 32B and a reverse or left-hand screw thread portion 68 of the bolt at the other end protrudes outboard of the other vertical leg 32A.

As seen best in FIGS. 2 and 5–7, the one-way clutch 56 includes a tubular metal spacer 70, a plastic ratchet wheel 72, and a plastic driver 74 all disposed between the bolt head 66 and the vertical leg 32B of the stationary bracket. The ratchet wheel 72 has a bore 76 through which the bolt 54 freely protrudes and a circular array of ratchet teeth 78 facing the bolt head 66. A pair of integral lugs 80A-B on the opposite side of the ratchet wheel 72 from the teeth 78 protrude into the vertical slot 46B and prevent rotation of the ratchet wheel relative to the vertical leg without impeding up and down movement of the bolt 54 in the slot 46B. For economical manufacture, the ratchet wheel 72 and the driver 74 may be molded as a single unit attached by an integral, flexible tether 82.

The tubular spacer 70 fits around the bolt 54 in the bore 76 of the ratchet wheel 72. The length of the spacer 70 exceeds the thickness of the ratchet wheel so that a portion of the spacer extends beyond the ratchet wheel toward the bolt head 66, FIG. 6. A lip 84 of the spacer nests in a correspondingly shaped pocket in the ratchet wheel and spans the vertical slot 46B.

The plastic driver 74 has a bore through which the bolt 54 freely protrudes and a socket 86 shaped to match the bolt head 66. The bolt head 66 seats in the socket 86 so that the driver and the bolt are rotatable as a unit about the lateral centerline 64. The tubular spacer 70 engages the bolt head 66 directly to prevent the plastic driver and plastic ratchet wheel being crushed between the bolt head and the vertical leg 32B of the stationary bracket.

A plurality of integral plastic pawls 88 of the driver 74 radiate out from the socket 86. Each pawl 88 terminates at a drive tooth 90 which is self-biased by the natural resilience of the corresponding pawl into engagement on the ring of ratchet teeth 78 on the ratchet wheel. The drive teeth 90 are configured to lock against the ratchet teeth 78 in the clockwise direction of rotation of the driver and the bolt, FIGS. 5 and 7, about the centerline 64 and to ratchet over the ratchet teeth 78 in the counterclockwise direction of rotation of the driver and the bolt about the lateral centerline 64 when the effort applied to the driver 74 and to the bolt 54 exceeds friction between the drive teeth 90 and the ratchet teeth 78 induced by the natural resilience of the pawls 88.

The lever stop 58 of the clamp 52 is a flat plastic plate bearing against the outboard surface of the vertical leg 32A of the stationary bracket and includes an integral tubular journal 92 protruding through the vertical slot 46A, a pair of integral lugs 94A-B on opposite sides of the journal also protruding into the vertical slot 46A, and a plurality of spacer holes 96 arrayed around the journal. The bolt 54 protrudes freely through the tubular journal 92 while the lugs 94A-B prevent rotation of the lever stop relative to the vertical leg without impeding up and down movement of the bolt in the vertical slot 46A.

Figure 3:
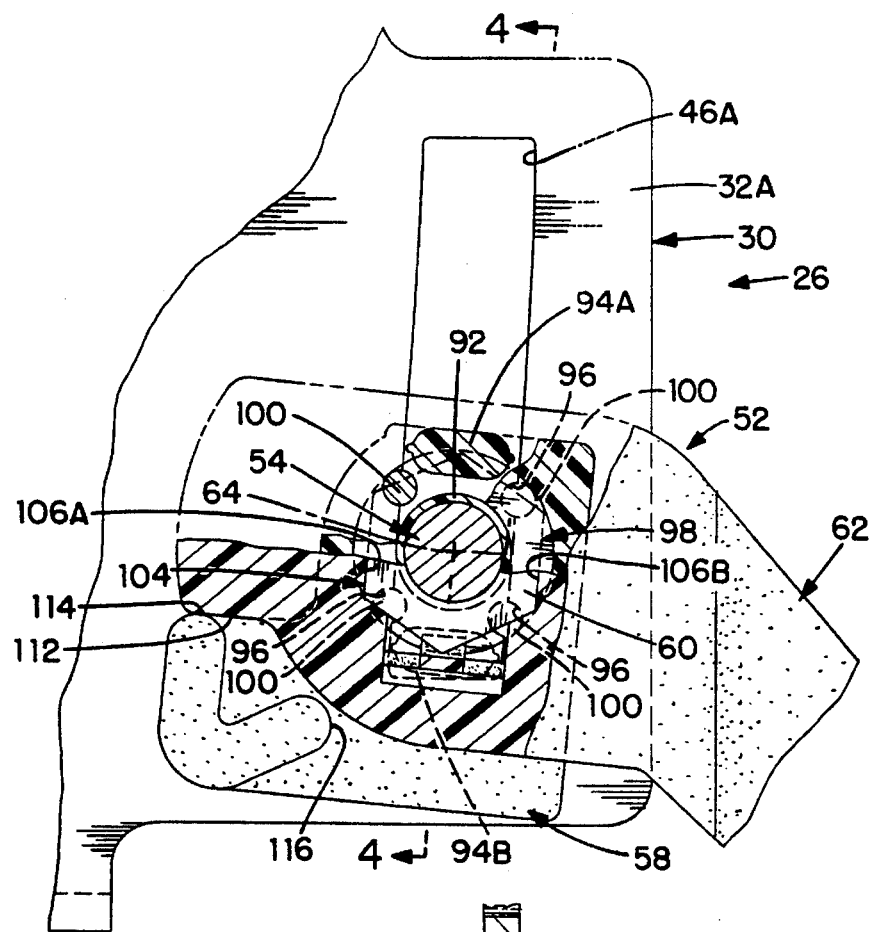
FIG. 3 is a sectional view taken generally along the plane indicated by lines 3—3 in FIG. 2.
Figure 4:
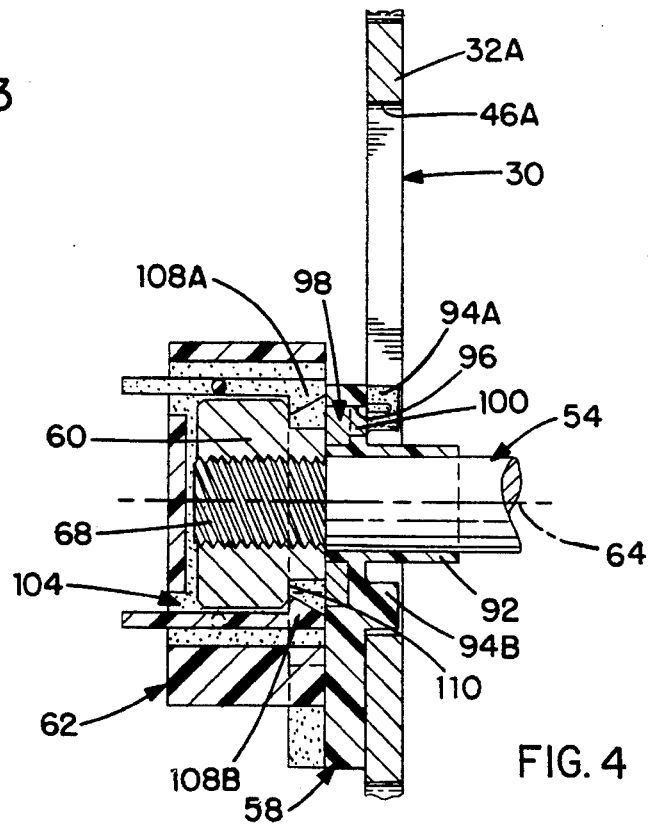
FIG. 4 is a sectional view taken generally along the plane indicated by lines 4—4 in FIG. 3.
Figure 5:
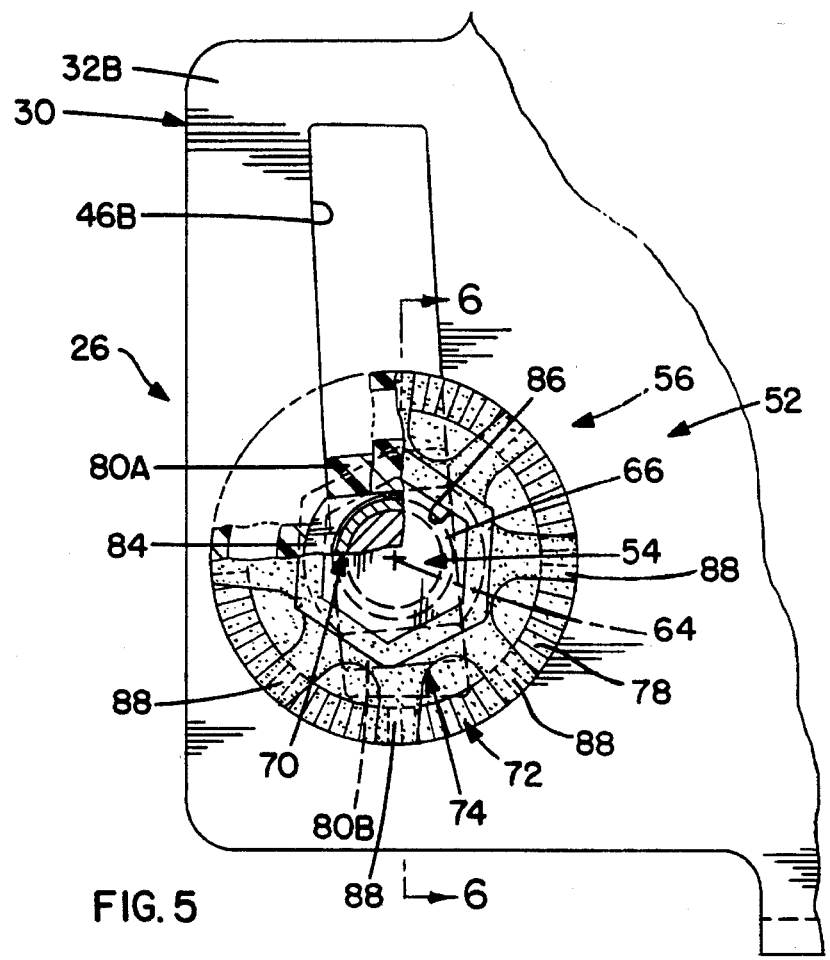
FIG. 5 is a sectional view taken generally along the plane indicated by lines 5—5 in FIG. 2.
Figure 6:
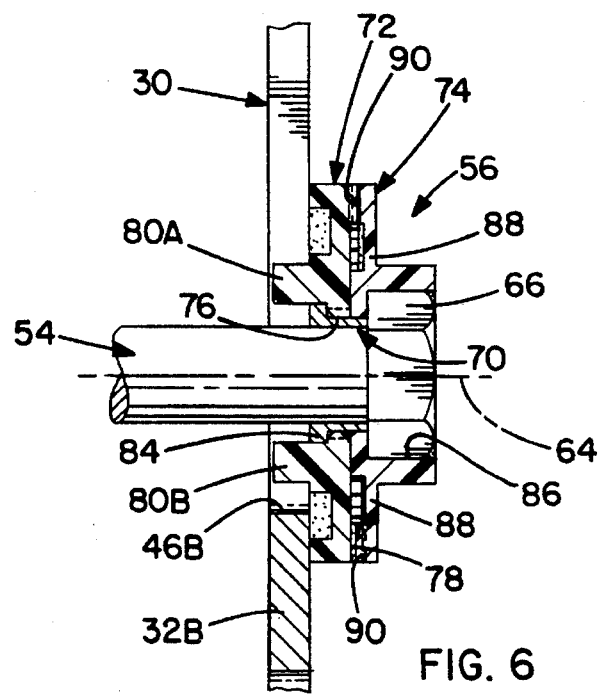
FIG. 6 is a sectional view taken generally along the plane indicated by lines 6—6 in FIG. 5.

An annular metal spacer 98 seats in a correspondingly shaped pocket in the lever stop so that the spacer is flush with the outside of the lever stop. The spacer has a plurality of integral pegs 100 received in respective ones of the spacer holes 96 in the lever stop. The nut 60 engages the left-hand screw thread portion 68 of the bolt outboard of the lever stop 58 and the spacer 98 so that counterclockwise rotation, FIG. 3, of the nut about the lateral centerline 64 tensions the bolt between the stationary vertical legs 32A-B. The pegs 100 of the spacer bear directly against the stationary vertical leg 32A to prevent the plastic lever stop being crushed between the nut 60 and the vertical leg 32A.

As seen best in FIGS. 1, 3, 4 and 7, the plastic operating lever 62 includes an enlarged finger grip 102 at one end and a socket 104 at the other end. The socket 104 has a pair of parallel, flat sides 106A-B separated by a span corresponding generally to the span between flat sides of the hexagon nut 60. Between the flat sides 106A-B, the socket 104 is expanded to provide clearance for a pair of integral, flexible hooks 108A-B. When the socket 104 is pushed over the hexagon nut 60, a pair of parallel sides of the nut are closely received between the flat sides 106A-B of the socket so that the nut is rotatable as a unit with the lever about the lateral centerline 64. Concurrently, a barb on each hook 108A-B snaps over a shoulder 110 on the nut to retain the lever on the nut. To release the lever from the nut, each hook 108A-B has a short tang extending beyond the lever which, when depressed, raises the corresponding barb above the shoulder 110.

The clamp 52 and the stationary bracket 30 are installed on the steering column 10 in advance of final installation on a vehicle. To that end, the stationary bracket 30 is fitted over the spacer 40 and all of the elements described above are loosely fitted in their described positions, except that the lever 62 is not initially snapped onto the nut 60. Before that occurs, the stationary bracket and the steering column are temporarily mounted in a fixture, not shown, which approximates their installed positions in a vehicle and the nut 60 is tightened on the bolt 54 to a torque calculated to achieve a functionally acceptable frictional clamp between the vertical legs 32A-B and the sides 42A-B of the spacer. Then, the lever 62 is snapped onto the nut 60 such that an edge 112 of the lever is juxtaposed an up-stop shoulder 114, FIG. 3, on the lever stop 58 which defines a clamped terminal position of the lever 62, FIG. 1.

Clockwise rotation of the lever 62 about the lateral centerline 64 from the clamped terminal position relieves the tension in the bolt and releases the frictional grip of the vertical legs 32A-B on the sides 42A-B of the spacer because friction between the drive teeth 90 and the ratchet teeth 78 induced by the natural resilience of the pawls 88 exceeds friction between the screw threads on the nut 60 and the screw thread portion 68 of the bolt 54. Such releasing movement of the lever 62 is limited by a down-stop shoulder 116 on the lever stop 58 which is engaged by an edge of the lever and which defines a released terminal position, not shown, of the lever.

The frictional grip of the stationary vertical legs 32A-B on the sides 42A-B of the spacer resulting from the aforesaid nominal tightening of the nut 60 may require adjustment after assembly on a vehicle due to stack-up of manufacturing tolerances. To that end, an operator simply fits an appropriate wrench, not shown, over the outside of the socket 86 of the ratchet driver 74 and turns it and the bolt 54 counterclockwise, FIGS. 5 and 7, while maintaining the operating lever 62 in its clamped position. Rotation of the bolt, accompanied by ratcheting of the driver teeth 90 over ratchet teeth 78, threads the bolt further into the nut 60 to increase the bolt tension and, consequently, the frictional grip of the stationary legs 32A-B on the spacer in the clamped position of the lever 62. When an acceptable frictional grip is achieved, the ratchet driver and ratchet teeth combine to prevent reverse rotation of the bolt relative to the nut. Of course, the integral bridge 82 tethering the ratchet wheel and ratchet driver is simply severed during adjustment of the bolt 54 relative to the nut 60.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A position control apparatus for a rake adjustable motor vehicle steering column comprising:

a stationary bracket having a first vertical leg with a first substantially vertical slot therein and a second vertical leg with a second substantially vertical slot therein disposed on opposite sides of a mast jacket of said steering column, a bolt rotatably supported on said mast jacket spanning said first and said second vertical legs through said first and said second substantially vertical slots having a head outboard of said first vertical leg and a screw thread portion outboard of said second vertical leg, a nut outboard of said second vertical leg engaging said screw thread portion of said bolt such that relative rotation between said bolt and said nut in a clamping direction tensions said bolt between said first and said second vertical legs and relative rotation in an opposite releasing direction releases said bolt tension between said first and said second vertical legs, a one-way clutch means between said bolt head and said first vertical leg operative to permit rotation of said bolt relative to said first vertical leg in only said bolt tensioning direction, an operating lever, and means connecting said operating lever to said nut for rotation as a unit therewith between a clamped position corresponding to maximum bolt tension between said first and said second vertical legs and a released position corresponding to minimum bolt tension between said first and said second vertical legs.

2. The position control apparatus recited in claim 1 wherein said means connecting said operating lever to said nut for rotation as a unit therewith includes:

a snap-on connecting means between said operating lever and said nut.

3. The position control apparatus recited in claim 2 further including:

means on said snap-on connecting means operative to release said operating lever from said nut.

4. The position control apparatus recited in claim 1 wherein said one-way clutch means includes:

a ratchet wheel rotatably supported on said bolt between said bolt head and said first vertical leg, means on said ratchet wheel and on said stationary bracket operative to prevent rotation of said ratchet wheel relative to said first vertical leg without restricting movement of said bolt in said first substantially vertical slot, means defining a circular array of ratchet teeth on said ratchet wheel on a side thereof facing said bolt head, a ratchet driver between said bolt head and said ratchet wheel having a pawl with a drive tooth thereon biased against said circular array of ratchet teeth on said ratchet wheel such that said ratchet driver is rotatable relative to said ratchet wheel in only said bolt tensioning direction, and means connecting said ratchet driver to said bolt for unitary rotation so that said bolt is rotatable in only said bolt tensioning direction relative to said stationary bracket.

5. The position control apparatus recited in claim 4 wherein said means connecting said ratchet driver to said bolt includes:

means on said ratchet driver defining a socket shaped to closely receive said bolt head.

6. The position control apparatus recited in claim 5 wherein:

each of said ratchet wheel and said ratchet driver are unitary molded plastic elements.

7. The position control apparatus recited in claim 6 wherein:

each of said ratchet wheel and said ratchet driver are molded as a unit and tethered together by an integral plastic bridge.

* * * * *